2,769,821

1,4-NAPHTHOQUINONEIMINE COMPOUNDS AND METHODS OF PREPARING THE SAME

Joe H. Clark, Darien, and Jackson P. English, Stamford, Conn., assignors to American Cyanamid Company, New York, N. Y., a corporation of Maine No Drawing. Application May 21, 1953, Serial No. 356,588

9 Claims. (Cl. 260—396)

This invention relates to new 1,4-naphthoquinoneimines, their addition salts with acids and methods of preparing the same. This application is a continuation-in-part of application S. N. 217,881, filed March 27, 1951.

The new compounds of this invention, when in the form of their free bases may be represented by the following structural formula:

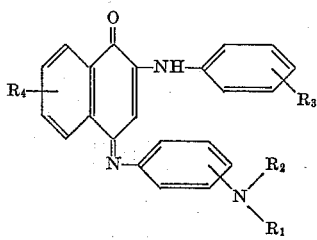

wherein $R_1$ represents a member selected from the group consisting of hydrogen, lower alkyl radicals and lower hydroxyalkyl radicals; $R_2$ represents a member selected from the group consisting of lower hydroxyalkyl radicals and lower alkyl radicals; and $R_3$ represents hydrogen or at least one substituent selected from the group consisting of lower alkyl, lower alkoxy, lower alkylamino, lower hydroxyalkylamino, lower di(hydroxyalkyl)amino and lower dialkylamino radicals; and $R_4$ represents a member selected from the group consisting of halogen and lower alkyl radicals. Alkyl groups which may suitably be represented by $R_1$, $R_2$, $R_3$ and $R_4$ can be illustrated by ethyl, isopropyl and n-butyl; hydroxyalkyl groups which may suitably be represented by $R_1$ and $R_2$ can be illustrated by 2-hydroxyethyl and 3-hydroxypropyl; alkoxy groups which may suitably be represented by $R_3$ can be illustrated by ethoxy and methoxy; substituted amino groups which may suitably be represented by $R_3$ include ethylamino, n-butylamino, isopropylamino, 2-hydroxyethylamino, diethylamino, di(n-butyl)amino and di(2-hydroxyethyl)amino; and halogen radicals which may suitably be represented by $R_4$ can be illustrated by chlorine and bromine.

The new naphthoquinoneimines may be isolated in the form of their free bases and as such are crystalline compounds soluble in most organic solvents. Of course, the new compounds may also be isolated in the form of their acid addition salts, for instance as the hydrochloride, nitrate, or citrate. Whether in the form of their free bases or in the form of their acid addition salts, the new compounds of this invention are valuable dyestuffs. When in the form of their free bases, the new compounds generally display green-blue colors and when in the form of their acid addition salts they generally display red-violet colors.

The new compounds of this invention, whether in the form of their free bases or in the form of their acid addition salts, also show high activity against tubercle bacilli infections in mice. While the exact nature of this activity is not fully understood, it is known that the activity is greatly influenced by the variation of the groups represented by $R_1$, $R_2$ and $R_3$ in the above structural formula, and further that there is a critical relationship between these substituents. It is, for instance, necessary that the substituents labeled $R_1$, $R_2$ and $R_3$ have a total number of carbon atoms equal to three or more. For example, $R_3$ may be hydrogen only if the total number of carbon atoms in $R_1$ and $R_2$ is equal to three or more. If the members represented by $R_1$, $R_2$ and $R_3$ in the above formula contain a total number of carbon atoms less than three, the compounds are much less active if not completely inactive.

The following table is for the purpose of showing the critical nature of the substituents labeled $R_1$, $R_2$ and $R_3$ in the above structural formula. The table represents the results of tests in which two sets of mice infected with a virulent strain of tubercle bacilli were fed, beginning on the day of infection, a selected naphthoquinoneimine mixed with their food in amounts equal to 0.1% and 0.4% by weight of the food, as indicated in the table, for a period of fourteen days, after which treatment was discontinued. The median survival time of the mice so treated was calculated and is as given in the table. The virulence of the infection was such that the untreated controls had a median survival time of fourteen days.

TABLE

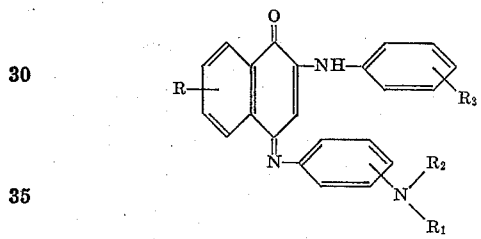

| $R_2$ $\diagdown$ N $\diagup$ $R_1$ | $R_3$ | $R_4$ | Median Survival Time, days | |
|---|---|---|---|---|
| | | | 0.1% of diet | 0.4% of diet |
| p-N($C_2H_5$)$_2$ | p-$CH_3$ | H | 24 | 27 |
| p-N($C_2H_5$)$_2$ | m-$CH_3$ | H | 21 | 24 |
| p-N($C_2H_5$)$_2$ | o-$CH_3$ | H | 24 | 28 |
| p-N($C_2H_5$)$_2$ | p-N($C_2H_5$)$_2$ | H | 25 | 28 |
| p-N($C_2H_5$)$_2$ | H | H | 20 | 24 |
| p-N($C_2H_5$)$_2$ | p-N($CH_2CH_2OH$)$_2$ | H | 20 | 39 |
| p-N($C_2H_5$)$_2$ | p-NH-i-$C_3H_7$ | H | 25 | 35 |
| p-N($C_2H_5$)$_2$ | p-NH-i-$C_3H_7$ | 7-Cl | 30 | 34 |
| p-N($C_2H_5$)$_2$ | p-$CH_3$ | 7-Cl | 29 | 25 |
| p-NH-i-$C_3H_7$ | p-NH-i-$C_3H_7$ | H | 26 | 39 |
| p-N($CH_3$)$_2$ | p-$CH_3$ | H | 22 | 21 |
| p-N($CH_3$)$_2$ | H | H | [1] NMA | [1] NMA |
| Controls | | | 14 days | |

[1] NMA = no measurable activity.

As will be seen from the above table, compounds wherein $R_1$, $R_2$ and $R_3$ contain a total of three or more carbon atoms have an appreciable activity but compounds wherein $R_1$, $R_2$ and $R_3$ contain a total of less than three carbon atoms possess no measurable activity.

It should not be inferred from the above tests that the naphthoquinoneimines are only effective in the amounts there employed. It should likewise not be inferred that treatment should be discontinued after a certain period of time as was done in the tests. So far as is known, the new compounds may be employed for as long a period as desired.

The new compounds of the present invention offer advantages over the antibiotics now commonly employed against tubercle bacilli infections in that they are orally administered. Also, there has been no tendency observed for the new compounds to cause the development of drug resistant strains.

While it is intended that this invention cover the new dyes regardless of how they are prepared, a particularly convenient method of preparing the new compounds has been discovered and this method also constitutes a part of this invention. The new method comprises reacting an N-(dialkylaminophenyl)-1,4-naphthoquinoneimine with the appropriately substituted aniline compound as illustrated by the following equation:

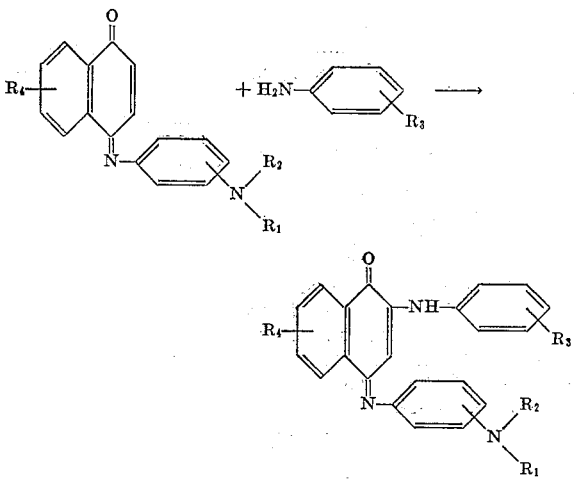

in which $R_1$, $R_2$, $R_3$ and $R_4$ are as defined above.

The reaction may be performed in an inert solvent such as illustrated by the following: aliphatic alcohols, for instance ethanol or butanol; and cyclic ethers, for instance dioxane. It has been found that the addition of a small amount of an acid, for instance a lower fatty acid such as acetic acid, to the reaction mixture results in a substantial increase in reaction velocity. Even when added in amounts as small as 10% by weight of the naphthoquinoneimine reactant the acid shows a substantial catalytic effect. Larger amounts of acid, however, are not detrimental, and in fact a preferred procedure comprises employing a lower fatty acid such as glacial acetic as the only solvent for the reaction.

The reaction may conveniently be carried out at room temperatures, for instance 20–30° C., however, in some instances higher temperatures are advantageous and the reaction may be performed at temperatures up to about 120° C. if desired. The reaction product is in most instances insoluble in the solvent and will collect on the bottom of the vessel as a precipitate. In most instances the precipitation will cease within twenty-four to forty-eight hours indicating that the reaction is substantially complete. When a lower fatty acid such as glacial acetic acid is employed as the only solvent, no precipitation occurs as the new dyes are soluble in such acids; however, under such conditions the reaction is extremely rapid and generally will be substantially complete in approximately ten minutes.

The compound N-(4-dimethylaminophenyl)-1,4-naphthoquinoneimine is a well known dye and is often referred to as Indonaphthol Blue. It can be prepared by methods well known in the art. Other N-(dialkylaminophenyl)-1,4-naphthoquinoneimines of the above formula which are employed as reactants in the process of this invention and in which $R_1$ and $R_2$ represent groups other than methyl have not, so far as is known, been previously reported in the literature but may be easily prepared by the same methods commonly employed for the preparation of Indonaphthol Blue.

It is an advantage of the present invention that the new compound can be prepared by several alternative methods and two alternative methods are demonstrated in the examples to follow.

The invention will be more particularly illustrated by the following specific examples in which all parts are by weight unless otherwise indicated:

*Example I.—N-(4-dimethylaminophenyl)-2-(4-methylanilino)-1,4-naphthoquinoneimine*

Twenty-seven parts of N-(4-dimethylaminophenyl)-1,4-naphthoquinoneimine and 16 parts of p-toluidine are added to a mixture of 5.5 parts by volume of acetic acid and 750 parts by volume of alcohol, and the whole is stirred at room temperature for twenty-three hours. The crystalline solid is filtered, washed on the filter with alcohol and recrystallized from benzene to give N-(4-dimethylaminophenyl)-2-(4-methylanilino)-1,4 - naphthaquinone - imine.

*Example II.—N-(4-diethylaminophenyl)-2-(4-methylanilino)-1,4-naphthoquinoneimine*

Twenty-two and seven-tenths parts of N-(4-diethylaminophenyl)-1,4-naphthoquinoneimine and 12.1 parts of p-toluidine are added to a mixture of 4 parts by volume of acetic acid and 600 parts by volume of alcohol, and the whole stirred for about sixty-four hours at room temperature. The crystalline solid is filtered and crystallized from methyl cyclohexane to give N-(4-diethylaminophenyl)-2-(4-methylanilino)-1,4-naphthoquinoneimine.

*Example III.—N-(4-diethylaminophenyl)-2-(4-methylanilino)-1,4-naphthoquinoneimine*

Eleven parts of 4-(4-diethylaminoanilino)-1,2-naphthoquinone and 4 parts of p-toluidine are added to 680 parts by volume of n-butanol, and the whole is heated under reflux for twenty-four hours. The reaction mixture is cooled and the product collected. The material is crystallized from alcohol but requires chromatography on alumina to obtain material equivalent to that prepared in Example II.

*Example IV.—N-(4-diethylaminophenyl)-2-(4-diethylaminoanilino)-1,4-naphthoquinoneimine*

Six and one-half parts of 4-(4-diethylaminoanilino)-1,2-naphthoquinone and 4 parts of p-diethylaminoaniline hydrochloride are added to a mixture of 2 parts of triethylamine and 350 parts by volume of n-butanol. The mixture is heated under reflux for two hours, cooled, and the separated solid is filtered. The material is crystallized from butanol to give purified N-(4-diethylaminophenyl)-2-(4-diethylaminoanilino)-1,4-naphthoquinoneimine.

N-(4-diethylaminophenyl)-2-(4 - diethylaminoaniline)-1,4-naphthoquinoneimine can also be prepared by the procedure of Example II by substituting p-diethylaminoaniline for the p-toluidine of that example.

*Example V.—N-(4-diethylaminophenyl)-2-anilino-1,4-naphthoquinoneimine*

Twenty-three parts of N-(4-diethylaminophenyl)-1,4-naphthoquinoneimine and 11 parts of aniline are added to 4 parts of acetic acid and 600 parts of alcohol and stirred at room temperature for twenty hours. The solid is collected and crystallized from benzene to give pure N-(4-diethylaminophenyl)-2-anilino-1,4-naphthoquinoneimine.

*Example VI.—N-(4-diethylaminophenyl)-2-(3-methylanilino)-1,4-naphthoquinoneimine.*

Twenty-three parts of N-(4-diethylaminophenyl)-1,4-naphthoquinoneimine and 12 parts of m-toluidine are added to 4 parts by volume of acetic acid and 600 parts by volume of alcohol, and the whole stirred for sixty hours at room temperature. The solid is filtered off and crystallized from benzene or cyclohexane to give pure N-4-diethylaminophenyl) - 2 - (3-methylanilino)-1,4-naphthoquinoneimine.

*Example VII.—N-(4-diethylaminophenyl)-2-(2-methyl-anilino)-1,4-naphthoquinoneimine*

This compound is prepared by following the procedure of Example VI but using o-toluidine in place of the m-toluidine.

*Example VIII.—N-(4-diethylaminophenyl)-2-(4-methyl-anilino)1,4-naphthoquinoneimine*

Fifteen parts of N-(4-diethylaminophenyl)-1,4-naphthoquinoneimine and 7.5 parts of p-toluidine are added to 100 parts by volume of glacial acetic acid. Reaction occurs at once as shown by heat evolution and a color change from dark green to purple. The mixture is allowed to stand about ten minutes, poured into about 1,000 parts by volume of water and neutralized with ammonium hydroxide. The resulting precipitate is filtered, dried and recrystallized from methyl cyclohexane to obtain a product identical with that obtained by the procedure of Example II.

The procedure employed in this example is an excellent one which may be used to prepare other new compounds of this invention. For instance, N-(4-diethylaminophenyl)-2-anilino-1,4-naphthoquinonemine, N-(4-diethylaminophenyl) - 2 - (3-methylanilino)-1,4-naphthoquinoneimine, N - (4 - diethylaminophenyl)-2-(2-methyl-anilino) - 1,4 - naphthoquinoneimine, and N - (4 - diethylaminophenyl) - 2 - (4-diethylaminoanilino)-1,4-naphthoquinoneimine can be prepared by substituting for the p-toluidine of the above example, aniline, m-toluidine, o-toluidine, and p-diethylaminoaniline respectively.

*Example IX. — N-(p-diethylaminophenyl)-2-[p-di)2-hydroxyethyl)aminoanilino]1,4-naphthoquinoneimine*

A mixture of 10.6 parts of N-(p-diethylaminophenyl)-1,4-naphthoquinoneimine, 7 parts of N,N-dihydroxyethyl-p-phenylenediamine, 300 cc. of alcohol, and 2 parts of glacial acetic acid was stirred for eighteen hours and the resulting suspension was filtered. This solid was crystalized from ethanol and then dissolved in 1:3 chloroform-benzene. This solution was chromatographed on alumina developing with chloroform until the first blue band had been eluted. This was discharded and the development was continued with 1:3 alcohol-chloroform to remove another blue band. The solvent containing this was evaporated to dryness and the residue was crystallized from ethyl acetate to give N-(p-diethylaminophenyl)-2-(p - diethanolaminoanilino) - 1,4 - naphthoquinoneimine; M. P. 180–181° C.

*Example X.—N-(p-diethylaminophenyl)-2-(p-isopropyl-aminoanilino)-1,4-naphthoquinoneimine*

A mixture of 11 parts of N-isopropyl-p-phenylenediamine, 23 parts of N-(p-diethylaminophenyl)-1,4-naphthoquinoneimine, 400 parts of alcohol, and 10 parts of glacial acetic acid stirred at room temperature for twenty hours and filtered. The solid was extracted with hot ethanol and crystallized from 1:1 cyclohexane-benzene to give N - (p-diethylaminophenyl)-2-(p-isopropylamino-anilino)-1,4-naphthoquinoneimine; M. P. 178–179° C.

*Example XI.—N-(p-isopropylaminophenyl)-2-(p-isopropylaminoanilino)-1,4-naphthoquinoneimine*

A mixture of 35 parts of 1-nitroso-2-naphthol, 58 parts of n-nitroaniline, and 150 parts of glacial acetic acid was refluxed for twenty minutes. The mixture was cooled and the product was collected, washed with acetic acid and then with ethanol. Crystallization from nitrobenzene gave N-(p-nitrophenyl)-2-(p-nitroanilino)-1,4-naphthoquinoneimine; M. P. 293–294° C.

A mixture of 4 parts of the above nitro compound, 75 parts of acetone, and 0.2 part of platinum oxide was shaken under an initial hydrogen pressure of 50 lbs. per sq. in. After the pressure had dropped 20 lbs, the solution was filtered from the catalyst and exposed to the air to oxidize the leuco compound. The solvent was evaporated and the residue was dissolved in benzene and chromatographed on alumina, developing with 1:9 chloroform-benzene. The first band was collected and the solvent evaporated. The residue was crystallized from 1:1 benzene-cyclohexane to give N - (p - isopropylaminophenyl) - 2 - (p-isopropylaminonanilino) - 1,4 - naphthoquinoneimine; M. P. 106–161° C.

*Example XII.—7-chloro-N-(p-diethylaminophenyl)-2-(p-toluidino)-1,4-naphthoquinoneimine*

A mixture of 75 parts of silver nitrate in 400 parts of water, 29.3 parts of salt in 375 parts of water, 1.2 parts of gelatin in 120 parts of water, 34 parts of sodium carbonate in 200 parts of water, 9 parts of 7-chloro-1-naphthol in 200 parts of ethanol, and 11 parts of N,N-diethyl-p-phenylenediamine hydrochloride in 400 parts of water was stirred vigorously for thirty minutes and filtered. The solid was dried and extracted continuously with ethyl acetate to remove the product. The ethyl acetate was evaporated to dryness and the residue was dissolved in benzene and chromatographed on alumina, developing with the same solvent. A brown first fraction was discarded and the second blue band was collected. A solvent was evaporated and the residue was crystallized from cyclohexane to give 7-chloro-N-(p-diethylaminophenyl) - 1,4 - naphthoquinoneimine; M. P. 106° C.

A mixture of 10 parts of 7-chloro-N-(p-diethylaminophenyl)-1,4-naphthoquinoneimine, 3.2 parts of p-toluidine, 200 parts of alcohol, and 5 parts of acetic acid was stirred for eighteen hours. The reaction mixture was filtered and the solid was crystallized from 1:1 benzene-cyclohexane to give 7-chloro-N-(p-diethylaminophenyl)-2-(p-toluidino)-1,4-naphthoquinoneimine; M. P. 167° C.

*Example XIII.—7-chloro-N-(p-diethylaminophenyl)-2-(p-isopropylaminoanilino)-1,4-naphthoquinoneimine*

A mixture of 16 parts of 7-chloro-N-(p-diethylaminophenyl)-1,4-naphthoquinoneimine (prepared by procedure of Example XII), 7 parts of N-isopropyl-p-phenylenediamine, 150 parts of alcohol, and 10 parts of acetic acid was stirred for twenty-four hours. The reaction mixture was filtered and the precipitate was dried. The solid was crystallized from benzene to give 7-chloro-N-(p-diethylaminophenyl)-2 - (p - isopropylaminoanilino)-1,4-naphthoquinoneimine; M. P. 181° C.

We claim:

1. Compounds selected from the group consisting of 1,4-naphthoquinoneimines represented by the formula:

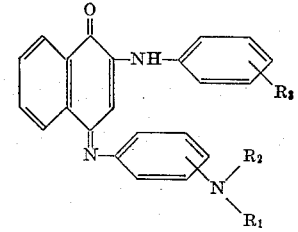

wherein $R_1$ and $R_2$ represent alkyl groups and $R_3$ represents a member selected from the group consisting of alkyl and dihydroxyalkylamino radicals; and acid addition salts thereof.

2. The N-[di(lower alkyl)aminophenyl]-2-{[(lower alkyl)-phenyl]amino}-1,4-naphthoquinoneimines, having the formula:

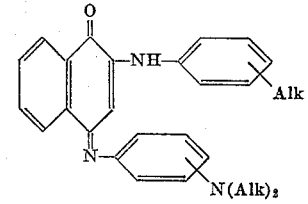

wherein Alk represents a lower alkyl radical.

3. The N-[4-di-(lower alkyl)aminophenyl]-2-{[2-(lower alkyl)-phenyl]amino}-1,4-naphthoquinoneimines, having the formula:

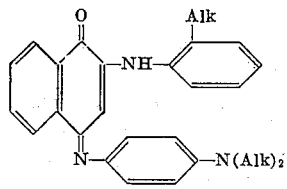

wherein Alk represents a lower alkyl radical.

4. The new compound N-(4-diethylaminophenyl)-2-(2-methylanilino)-1,4-naphthoquinoneimine, having the formula:

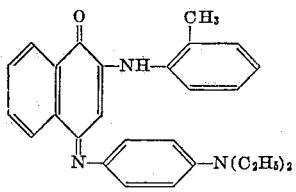

5. The N-[di-(lower alkyl)aminophenyl]-2-[di(lower hydroxyalkyl)aminoanilino]-1,4 - naphthoquinoneimines, having the formula:

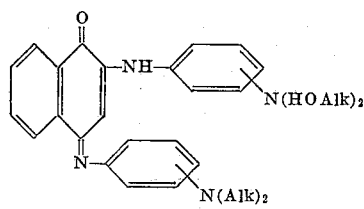

wherein HOAlk represents a lower hydroxy alkyl radical and Alk is a lower alkyl radical.

6. The N[4-di(lower alkyl)aminophenyl]-2-[4-di-(lower hydroxyalkyl)aminoanilino]-1,4-naphthoquinoneimines, having the formula:

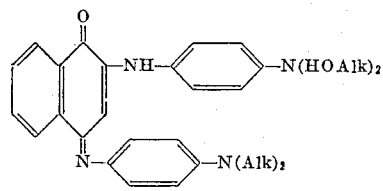

wherein HOAlk represents a lower hydroxy alkyl radical and Alk is a lower alkyl radical.

7. The new compound N-(4-diethylaminophenyl)-2-[4-di - (2 - hydroxyethyl)aminoanilino] - 1,4 - naphthoquinoneimine, having the formula:

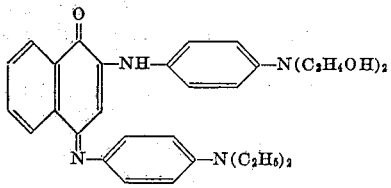

8. The method of preparing compounds selected from from the group consisting of 1,4-naphthoquinoneimines represented by the formula:

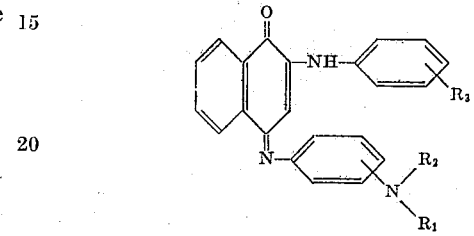

wherein $R_1$ and $R_2$ each represent an alkyl group and $R_3$ represents a member selected from the group consisting of alkyl and dihydroxyalkylamino radicals, and acid addition salts thereof, which method comprises contacting, under reaction conditions and in the presence of an acid, a compound selected from the group consisting of those represented by the formula:

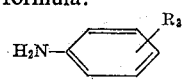

in which $R_3$ is as defined above, and acid addition salts thereof, with a compound represented by the formula:

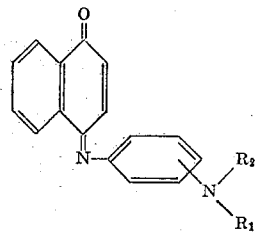

wherein $R_1$, $R_2$ and $R_3$ are as defined as above.

9. The method of claim 8, wherein the acid is a lower fatty acid employed in quantities sufficient to act as a solvent for the other reactants.

References Cited in the file of this patent

UNITED STATES PATENTS 2,153,956    Clifford _____ Apr. 11, 1939

FOREIGN PATENTS 595,327    Germany _____ 1934